(12) United States Patent
Shaw (10) Patent No.: US 12,320,076 B2
(45) Date of Patent: Jun. 3, 2025

(54) CONCRETE DOWEL PLACEMENT SYSTEM AND METHOD OF MAKING THE SAME

(71) Applicant: Shaw & Sons, Inc., Costa Mesa, CA (US)

(72) Inventor: Ronald D. Shaw, Costa Mesa, CA (US)

(73) Assignee: SHAW & SONS, INC., Costa Mesa, CA (US)

( * ) Notice: Subject to any disclaimer, the term of this patent is extended or adjusted under 35 U.S.C. 154(b) by 0 days.

(21) Appl. No.: 18/661,451

(22) Filed: May 10, 2024

(65) Prior Publication Data
US 2024/0308126 A1 Sep. 19, 2024

Related U.S. Application Data

(60) Division of application No. 18/186,078, filed on Mar. 17, 2023, now Pat. No. 12,059,832, which is a
(Continued)

(51) Int. Cl.
*E01C 11/14* (2006.01)
*E04B 1/41* (2006.01)
*E04B 1/48* (2006.01)

(52) U.S. Cl.
CPC ............ *E01C 11/14* (2013.01); *E04B 1/4114* (2013.01); *E04B 1/48* (2013.01); *E04B 1/483* (2013.01)

(58) Field of Classification Search
CPC .......... E01C 11/14; E04B 1/4114; E04B 1/48; E04B 1/483
See application file for complete search history.

(56) References Cited

U.S. PATENT DOCUMENTS

| 754,215 A | 3/1904 | Hayward |
| 1,045,562 A | 11/1912 | Kennedy |

(Continued)

FOREIGN PATENT DOCUMENTS

| CH | 568457 A5 | 10/1975 |
| DK | 52370 C | 11/1936 |

(Continued)

OTHER PUBLICATIONS

John P. Broomfield, "Corrosion of Steel in Concrete", 1997, E&FN Spon, 3 pgs.
(Continued)

*Primary Examiner* — Andrew J Triggs
(74) *Attorney, Agent, or Firm* — Stetina Garred Brucker & Newboles (57) ABSTRACT

A concrete dowel placement system and methods for making the same. The system allows for accurate and easy substantially-parallel or parallel placement of slip dowels within sections of concrete so that adjacent sections of concrete may be allowed to undergo thermal expansion and contraction while remaining in a common plane without cracking or faulting. The system includes a coupler and a sheath. The sheath is configured to be slidably extensible over the coupler and may be held to the coupler by friction. An outer surface of the sheath may be textured. Additionally, a method of constructing the concrete dowel placement system includes extruding material to form two tubes of different sizes. The tubes are then attached to each other, then material is extruded or injection molded to form a sheath. Alternatively, construction may include extruding material to form a tube, then removing some of the material from the tube in order to form a coupler.

7 Claims, 8 Drawing Sheets

Related U.S. Application Data division of application No. 17/469,400, filed on Sep. 8, 2021, now Pat. No. 11,623,380, which is a continuation of application No. 15/930,362, filed on May 12, 2020, now abandoned, which is a continuation of application No. 16/141,137, filed on Sep. 25, 2018, now abandoned, which is a continuation-in-part of application No. 15/587,141, filed on May 4, 2017, now Pat. No. 10,858,825, which is a continuation of application No. 14/874,997, filed on Oct. 5, 2015, now abandoned.

(56) References Cited

U.S. PATENT DOCUMENTS

| | | |
|---|---|---|
| 1,545,267 A | 7/1925 | Marye |
| 1,592,681 A | 7/1926 | Grothe |
| 1,631,576 A | 6/1927 | Bowers |
| 1,699,557 A | 1/1929 | Yeager |
| 1,728,936 A | 9/1929 | Johnson |
| 1,755,219 A | 4/1930 | Knox |
| 1,767,575 A | 6/1930 | Bujack |
| 1,826,062 A | 10/1931 | Farmer |
| 1,838,635 A | 12/1931 | Pilj |
| 1,852,673 A | 4/1932 | Pilj |
| 1,939,007 A | 12/1933 | Heltzel |
| 1,942,494 A | 1/1934 | Robertson |
| 1,953,846 A | 4/1934 | Briggs |
| 2,039,420 A | 5/1936 | Isett |
| 2,066,448 A | 1/1937 | Bahr |
| 2,095,060 A | 10/1937 | Geyer |
| 2,096,702 A | 10/1937 | Yeoman |
| 2,108,107 A | 2/1938 | De Wees |
| 2,110,738 A | 3/1938 | Parker |
| 2,129,568 A | 9/1938 | De Biasi |
| 2,166,220 A | 7/1939 | Older |
| 2,181,005 A | 11/1939 | Westcott |
| 2,262,704 A | 11/1941 | Tompkins et al. |
| 2,269,703 A | 1/1942 | Bagwill |
| 2,275,272 A | 3/1942 | Scripture, Jr. |
| 2,277,203 A | 3/1942 | Boult |
| 2,296,453 A | 9/1942 | Saffert |
| 2,319,526 A | 5/1943 | Wearn |
| 2,331,949 A | 10/1943 | Whiteman |
| 2,365,550 A | 12/1944 | Heltzel |
| 2,373,284 A | 4/1945 | Autrey |
| 2,508,443 A | 5/1950 | Carter |
| 2,551,826 A | 5/1951 | Cox, Sr. |
| 2,636,426 A | 4/1953 | Heltzel |
| 2,746,365 A | 5/1956 | Darneille |
| 2,823,539 A | 2/1958 | Kersh et al. |
| 2,902,742 A | 9/1959 | Matich |
| 2,980,215 A | 4/1961 | Englund |
| 3,233,024 A | 2/1966 | Jackson et al. |
| 3,279,335 A | 10/1966 | Garner |
| 3,284,973 A | 11/1966 | Ames et al. |
| 3,318,224 A | 5/1967 | Bohanon |
| 3,333,380 A | 8/1967 | Wolf |
| 3,437,017 A | 4/1969 | Walz et al. |
| 3,451,179 A | 6/1969 | Kendzia |
| 3,527,486 A | 9/1970 | Gamp |
| 3,700,529 A | 10/1972 | Monaghan |
| D229,538 S | 12/1973 | Steffan |
| 3,896,599 A | 7/1975 | Werstein et al. |
| 3,920,221 A | 11/1975 | Berry et al. |
| 3,921,356 A | 11/1975 | Hughes |
| 4,077,177 A | 3/1978 | Boothroyd et al. |
| 4,087,072 A | 5/1978 | Olsen |
| 4,115,976 A | 9/1978 | Rohrer |
| 4,146,599 A | 3/1979 | Lanzetta |
| 4,158,937 A | 6/1979 | Henry |
| D257,503 S | 11/1980 | McKee |
| 4,252,767 A | 2/1981 | Piazza et al. |
| 4,261,496 A | 4/1981 | Mareydt et al. |
| 4,281,496 A | 8/1981 | Danielsson |
| 4,329,080 A | 5/1982 | Elley |
| D272,517 S | 2/1984 | Koehn |
| 4,437,828 A | 3/1984 | Egger |
| 4,449,844 A | 5/1984 | Larsen |
| 4,493,584 A | 1/1985 | Guntert |
| 4,496,504 A | 1/1985 | Steenson et al. |
| 4,533,112 A | 8/1985 | Santos, Jr. et al. |
| 4,578,916 A | 4/1986 | Witschi |
| 4,614,070 A | 9/1986 | Idland |
| 4,648,739 A | 3/1987 | Thomsen |
| 4,657,430 A | 4/1987 | Marionneaux |
| 4,726,561 A | 2/1988 | Worzala, Jr. |
| 4,748,788 A | 6/1988 | Shaw et al. |
| 4,752,153 A | 6/1988 | Miller |
| 4,800,702 A | 1/1989 | Wheeler |
| 4,801,425 A | 1/1989 | Michel et al. |
| 4,821,988 A | 4/1989 | Jimenez |
| 4,883,385 A | 11/1989 | Kaler |
| 4,899,497 A | 2/1990 | Madl, Jr. |
| 4,926,593 A | 5/1990 | Johnston |
| D309,280 S | 7/1990 | Balfanz-Lee |
| 4,938,631 A | 7/1990 | Maechtle et al. |
| 4,959,940 A | 10/1990 | Witschi |
| D314,325 S | 2/1991 | Ziaylek, Jr. et al. |
| 4,996,816 A | 3/1991 | Wiebe |
| 5,005,331 A | 4/1991 | Shaw et al. |
| 5,046,898 A | 9/1991 | McKinney |
| 5,096,155 A | 3/1992 | Fitzgerald |
| 5,134,828 A | 8/1992 | Baur |
| 5,205,942 A | 4/1993 | Fitzgerald |
| 5,212,919 A | 5/1993 | Shaw et al. |
| 5,216,862 A * | 6/1993 | Shaw ............... E04B 1/483 |
| | | 52/704 |
| 5,301,485 A | 4/1994 | Shaw et al. |
| D363,211 S | 10/1995 | Noble |
| 5,487,249 A | 1/1996 | Shaw et al. |
| D375,599 S | 11/1996 | Hirano et al. |
| D375,600 S | 11/1996 | Hirano et al. |
| 5,618,125 A | 4/1997 | McPhee et al. |
| 5,678,952 A * | 10/1997 | Shaw ............... E01C 11/14 |
| | | 404/136 |
| 5,694,730 A | 12/1997 | Del Rincon et al. |
| 5,713,174 A | 2/1998 | Kramer |
| 5,797,231 A | 8/1998 | Kramer |
| 5,934,821 A * | 8/1999 | Shaw ............... E01C 11/14 |
| | | 52/704 |
| D419,700 S | 1/2000 | Shaw et al. |
| 6,018,833 A | 2/2000 | Imm |
| 6,123,485 A | 9/2000 | Mirmiran et al. |
| 6,145,262 A | 11/2000 | Schrader et al. |
| 6,210,070 B1 | 4/2001 | Shaw et al. |
| 6,243,994 B1 | 6/2001 | Bernini |
| 6,354,053 B1 | 3/2002 | Kerrels |
| 6,354,760 B1 | 3/2002 | Boxall et al. |
| D459,205 S | 6/2002 | Shaw et al. |
| 6,502,359 B1 | 1/2003 | Rambo |
| 6,517,277 B2 | 2/2003 | Hu et al. |
| 6,655,869 B1 | 12/2003 | Deeb et al. |
| 6,775,952 B2 | 8/2004 | Boxall et al. |
| 6,926,463 B2 | 8/2005 | Shaw et al. |
| 7,004,443 B2 | 2/2006 | Bennett |
| 7,314,333 B2 | 1/2008 | Shaw et al. |
| 7,338,230 B2 | 3/2008 | Shaw et al. |
| 7,381,008 B2 | 6/2008 | Shaw et al. |
| 7,481,031 B2 | 1/2009 | Boxall et al. |
| 7,604,432 B2 | 10/2009 | Shaw et al. |
| 7,637,689 B2 | 12/2009 | Boxall et al. |
| 7,716,890 B2 | 5/2010 | Boxall et al. |
| 7,736,088 B2 | 6/2010 | Boxall et al. |
| 7,874,762 B2 | 1/2011 | Shaw et al. |
| 7,967,528 B2 | 6/2011 | Mercer et al. |
| 8,007,199 B2 | 8/2011 | Shaw et al. |
| 8,142,104 B2 | 3/2012 | Mercer et al. |
| 8,302,359 B2 | 11/2012 | Boxall et al. |
| 8,303,210 B2 | 11/2012 | Parkes et al. |
| 8,356,955 B2 | 1/2013 | Nadler |
| 8,381,470 B2 | 2/2013 | Boxall et al. |
| 8,573,884 B2 | 11/2013 | Nadler |
| 8,627,626 B2 | 1/2014 | Boxall et al. |

(56) References Cited

U.S. PATENT DOCUMENTS

| | | | |
|---|---|---|---|
| 9,340,969 B1* | 5/2016 | Shaw | B28B 1/14 |
| 9,458,638 B2 | 10/2016 | Parkes et al. | |
| 9,546,456 B2 | 1/2017 | Shaw | |
| 9,617,694 B2 | 4/2017 | Shaw | |
| 9,951,481 B2 | 4/2018 | Shaw | |
| 10,858,825 B2 | 12/2020 | Shaw | |
| 11,623,380 B2* | 4/2023 | Shaw | B29C 48/30 |
| | | | 29/527.1 |
| 12,059,832 B2* | 8/2024 | Shaw | E04G 21/185 |
| 2003/0144071 A1 | 7/2003 | Dodge et al. | |
| 2005/0265802 A1 | 12/2005 | Miller et al. | |
| 2007/0134063 A1 | 6/2007 | Shaw et al. | |
| 2010/0086351 A1 | 4/2010 | Mercer et al. | |
| 2014/0248076 A1* | 9/2014 | Shaw | E04B 1/483 |
| | | | 403/194 |
| 2015/0197898 A1* | 7/2015 | Shaw | E04B 1/48 |
| | | | 404/48 |
| 2016/0083914 A1 | 3/2016 | Shaw | |
| 2017/0096810 A1* | 4/2017 | Shaw | B29C 48/12 |
| 2018/0127926 A1 | 5/2018 | Shaw | |
| 2019/0024367 A1* | 1/2019 | Shaw | B29C 48/09 |
| 2019/0063006 A1 | 2/2019 | Shaw | |
| 2019/0271122 A1 | 9/2019 | Shaw | |
| 2020/0149228 A1 | 5/2020 | Shaw | |
| 2020/0299953 A1* | 9/2020 | Shaw | B29C 48/11 |
| 2021/0008776 A1* | 1/2021 | Shaw | B29C 48/32 |
| 2021/0292978 A1 | 9/2021 | Shaw et al. | |
| 2021/0402666 A1 | 12/2021 | Shaw | |
| 2022/0234271 A1 | 7/2022 | Shaw | |
| 2023/0226738 A1 | 7/2023 | Shaw | |
| 2024/0100758 A1 | 3/2024 | Shaw | |
| 2024/0308126 A1* | 9/2024 | Shaw | E04B 1/4114 |

FOREIGN PATENT DOCUMENTS

| | | |
|---|---|---|
| DK | 79813 C | 9/1955 |
| EP | 1123443 A1 | 8/2001 |
| EP | 1389648 A1 | 2/2004 |
| FR | 1094449 A | 5/1955 |
| GB | 1389648 A | 4/1975 |
| WO | 0023653 A1 | 4/2000 |

OTHER PUBLICATIONS www.pavement.com, "Load Transfer", May 27, 2003, 2 pgs.
www.pna-inc.com, "The Diamond Dowel System", May 22, 2003, 2 pgs.
www.danley.com.au, "Danley Diamond Dowel System", Mar. 24, 2005, 2 pgs.
Wayne W. Walker & Jerry A. Holland, "Plate Dowels for Slabs on Ground", 4 pgs.

* cited by examiner

CONCRETE DOWEL PLACEMENT SYSTEM AND METHOD OF MAKING THE SAME

CROSS-REFERENCE TO RELATED APPLICATIONS

The present application is a divisional patent application of Ser. No. 18/186,078 filed on Mar. 17, 2023, which is a divisional patent application of Ser. No. 17/469,400 filed on Sep. 8, 2021, now U.S. Pat. No. 11,623,380 issued on Apr. 11, 2023, which is a continuation patent application of U.S. patent application Ser. No. 15/930,362 filed on May 12, 2020, which is a continuation patent application of U.S. patent application Ser. No. 16/141,137 filed on Sep. 25, 2018, which is a continuation-in-part patent application of U.S. patent application Ser. No. 15/587,141 filed on May 4, 2017, now U.S. Pat. No. 10,858,825 issued on Dec. 8, 2020, which is a continuation patent application of U.S. patent application Ser. No. 14/874,997 filed on Oct. 5, 2015, the entire contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a system for use in concrete construction and a method for making the system. More specifically, the present disclosure relates to a system for placing slip dowels into concrete slabs accurately and a method for making the system.

2. Description of the Related Art

In construction, a "cold joint" in concrete may refer to a weakened interface between two sections of concrete that harden at different times. Typically, a concrete slab is formed by pouring concrete into a form all at once, where the concrete is allowed to harden. Although, sometimes it is desirable to form a continuous section of concrete by pouring it piecewise in sections at different times, allowing each section to harden to some extent before the next adjacent section is poured and allowed to harden. The interface between a previously poured section of concrete and a more recently poured section is called a cold joint.

A cold joint in concrete is typically weaker under tension than concrete that has been allowed to dry without any cold joints, and this weakness at the cold joint may cause problems after the concrete hardens. Due to this weakness, cold joints often become uneven or buckled due to thermal expansion and contraction of the concrete. Compaction of the underlaying soil caused by improper substrate preparation before pouring the concrete can also cause buckling or cracking at the cold joint. Further, too much water moisture may accumulate on the end face of the first concrete section before the second concrete section is poured and hardens. If the water freezes, undesirable cracking in the concrete may occur due to ice expansion against the concrete. In terms of aesthetics, cold joints often form a visual line at the interface of the two concrete sections, which is often undesirable.

To resist buckling, bulging, or displacement of concrete at the cold joint, it is common to insert long steel rods, known as "slip dowels," into the edge portions of adjoining concrete sections so that the concrete sections may slide freely along one or more of the slip dowels. This key feature, the ability to slide freely, may allow linear expansion and contraction of the concrete sections while substantially maintaining the concrete in a common plane, thus preventing undesirable buckling, bulging, or unevenness at the cold joint.

To function properly, it is typically important to properly position the slip dowels within adjoining concrete sections. For instance, most slip dowels are placed in substantially parallel alignment relative to each other to allow the concrete sections to slide along the slip dowels. Thus, the purpose of placing the slip dowels may be defeated when the dowels are not positioned in substantially parallel relation to each other because, in such a case, the concrete sections are not able to slide along the slip dowels. Further, nonparallel placement of slip dowels can cause cracking in the concrete as well as faulting, i.e., misalignment of the concrete sections at the cold joint. Thus, various systems, methods, and devices have been developed for installing slip dowels properly.

In the prior art, two methods of installing slip dowels have become widely used. According to the first method, concrete may be poured into a first form. After the first pour hardens sufficiently, an edge of the form, usually a wooden stud, may be removed. Next, a series of holes, arranged in a straight line, may be drilled into the first concrete slab along the exposed edge from which the form has been removed. The depth and diameter of the individual holes may vary depending on the purpose of the concrete slabs and the size of the concrete slabs to be supported. Generally, these holes are at least twelve inches deep and typically have a diameter of approximately five-eighths of an inch, which is complimentary to typical slip dowels having a diameter of five-eighths of an inch.

After the series of holes are drilled into the edge of the first portion of concrete, dowel rods may be inserted into each hole so that one end of each dowel rod is positioned within the first section of concrete. The remainder of each dowel extends into the adjacent area where the second slab of concrete is to be poured. Next, concrete may be poured into the adjacent area and is permitted to harden with the dowels inside. After the second section of concrete hardens, the dowels are held firmly within the second section, but are permitted to slide longitudinally within the drilled holes of the first section. This allows longitudinal expansion and contraction of the two concrete sections while at the same time preventing buckling or faulting at the cold joint.

The "drilling method" of placing slip dowels described above is very labor intensive. It can take about ten minutes to drill a five-eighths inch diameter by twelve inches long hole into the first concrete section. Additionally, the drilling equipment, bits, accessories, and associated setup time tends to be very expensive. Moreover, the construction workers who drill the holes and place the slip dowels must have sufficient training to ensure generally parallel arrangement of each dowel to the other dowels and to the underlying support surface.

A second widely-used method of placing slip dowels involves using wax-treated cardboard sleeves positioned over one end of each individual dowel. By this method, a series of holes may be drilled through one edge of a concrete form and smooth dowels may be inserted through each hole. Wax-treated cardboard sleeves may be placed over one end of each dowel and the first pour may be made within the form. After the first pour hardens, the previously-drilled form may be stripped away, leaving the individual dowels extending into the adjacent open space where the second pour is to be made. Subsequently, the second pour may be made and allowed to harden. As a result, the slip dowels are held firmly by the concrete of the second pour but are permitted to slide longitudinally against the inner surfaces of the wax-treated cardboard sleeves within the first concrete section. Thus, the waxed cardboard sleeves facilitate longitudinal slippage of the dowels, while at the same time holding the two concrete slabs in a common plane, preventing undesirable buckling or angular movement at the cold joint.

Although this second method is widely used, it is commonly associated with a variety of problems. For example, after the first pour is made, the free ends of the dowels are likely to project as much as eighteen inches through the forms and into the adjacent open space allowed for the second pour. Because the drilled section of the form must be slid over those exposed sections of the dowels to accomplish stripping or removal of the form, it is not uncommon for the exposed portions of the dowels to become bent, and thus, not substantially parallel. Also, the drilled section of the form may become damaged or broken during the removal process, thus preventing its reuse.

Unfortunately, both of the popular methods of placing slip dowels discussed above often cause the slip dowels to be positioned at various angles rather than in the desired aligned arrangement. When this occurs, the necessary slippage of the slip dowels is impeded or prevented and the likelihood of cracking and faulting in the concrete increases.

Alternative prior art dowel placement devices may comprise elongated, hollow tubes sized to receive portions of dowel rods. The tubes may be mounted to one edge of a concrete form in generally parallel relation to each other via integral base portions. Next a first concrete pour may be made over the tubes. After the first pour hardens, the edge of the concrete form to which the tubes are mounted may be stripped away from the first slab. Then, dowel rods may be inserted into the exposed open ends of the tubes embedded within the first slab. The portions of the dowel rods not inserted into the tubes extend into an adjacent area where a second pour of concrete may be made. Concrete poured into the adjacent area completely covers the outer surfaces of the dowel rods which are held firmly within the second slab formed when the second pour hardens. The dowels, though being held firmly within the second slab, are permitted to slide longitudinally within the tubes embedded in the first slab.

Even though these prior art placement devices have advantages over the previously described dowel placement methods, several disadvantages inhibit their usefulness. In particular, the attachment of the base portions of these prior art placement devices to a concrete form often requires the use of multiple fasteners, making the attachment process difficult and time-consuming. Additionally, in the prior art placement devices, both the tube and its integral base portion used to facilitate the connection of the tube to the concrete form are embedded in the first slab, thus necessitating that additional placement devices be attached to the concrete form prior to its reuse. Further, the prior art placement devices are generally only suited for attachment to a concrete form, and not to reinforcement materials, such as rebar or wire mesh. As such, these prior art placement devices do not lend themselves to use within the interior areas of a poured slab, but rather are limited to use along the periphery of the slab which is defined by the concrete form to which the placement devices must be attached.

Another problem with prior art concrete dowel placement devices is the high manufacturing cost. Prior art placement devices have been manufactured using injection molding. Injection molding can be cost prohibitive and have other problems innate with the method itself. Such problems include burning of the material being molded, thus weakening its final structure; flashing, i.e., excess molded material attached to the molded product which requires extra time and effort to remove; and short shotting, i.e., when a region of the mold lacks sufficient quantity of injected material, resulting in a physical deformity in the final molded product.

Accordingly, there remains a need in the art for methods and/or systems for facilitating the proper placement of slip dowels, and methods for manufacturing such placement systems, which overcome the previously described deficiencies associated with prior art placement devices and systems.

BRIEF SUMMARY

The present disclosure specifically addresses and alleviates the above-identified deficiencies in the art. In this regard, the disclosure is directed to a concrete dowel placement system and method of making the concrete dowel placement system. As will be discussed in more detail below, the method allows for cost-efficient manufacturing of the system. The concrete dowel placement system allows for easy and accurate placement of slip dowels into concrete.

According to one embodiment, a method of constructing a concrete dowel placement system includes the step of constructing a coupler. The step of constructing a coupler includes the step of extruding a polymer to form a first tubular element. The step of constructing a coupler also includes the step of extruding a polymer to form a second tubular element, the second tubular element having a dimensional size different from a dimensional size of the first tubular element. The step of constructing a coupler additionally includes the step of attaching an end portion of the second tubular element to an end portion of the first tubular element. Further, the method includes the step of extruding or injection molding a polymer to form an elongated, tubular, dowel-receiving sheath, the sheath having an outer surface, at least one interior opening extending along the entire length of the sheath and the sheath being configured to be slidably extensible over the coupler to frictionally engage one of the first tubular element and the second tubular element.

It is contemplated that the method may also include the step of attaching an end cap to an end portion of the sheath to completely cover the at least one interior opening at the end of the sheath.

It is further contemplated that the step of extruding a polymer to form the first tubular element may include forming a body having a circular cross-sectional configuration along a longitudinal axis during extrusion of the polymer. The step of extruding a polymer to form the first tubular element may include forming the first tubular element to have an inner sleeve and a plurality of splines extending radially outward from the inner sleeve and longitudinally along the inner sleeve. The step of extruding a polymer to form the first tubular element may include forming the first tubular element to have a quadrangular configuration along a longitudinal axis during extrusion of the polymer. The first tubular element may define opposed first tubular element end portions having maximum outer diameters approximately equal to each other, and the second tubular element may define opposed tubular element end portions having maximum outer diameters approximately equal to each other.

The step of extruding a polymer to form the first tubular element may include forming at least one reinforcement wall between an inner sleeve and an outer sleeve during extrusion of the polymer.

The step of extruding a polymer to form a sheath may include forming at least one linear rib protrusion, raised helical element, helical groove element, or linear groove element along a longitudinal axis of the sheath on an outer surface of the sheath during extrusion of the polymer. Additionally, this step may include forming a sinusoidal outer surface or a helical uneven outer surface on the sheath during extrusion of the polymer.

Another embodiment of the disclosure relates to a concrete dowel placement system having a coupler. The coupler includes a first tubular element having an inner sleeve disposed about a central axis to define an aperture. An outer body is disposed radially outward of the inner sleeve. The coupler also includes a second tubular element having an inner sleeve disposed about a central axis to define an aperture. An outer body is disposed radially outward of the inner sleeve. The concrete dowel placement system also has a sheath having an outer surface, an interior opening extending along the entire length of the sheath and being slidably extensible over the coupler to frictionally engage one of the first tubular element and the second tubular element.

The concrete dowel placement system may also include an end cap attachable to the interior opening at the end of the sheath to completely cover the interior opening at the end of the sheath.

The outer body of the first tubular element may include a plurality of splines extending longitudinally along the inner sleeve.

Another embodiment of the disclosure relates to an additional method of making a concrete dowel placement system including the step of extruding a polymer to form a tubular element. The tubular element has at least one interior opening extending along the entire length of the tubular element. The method further includes the step of extruding a polymer to form a sheath. The method may also include the step of forming a coupler by removing some of the polymer from a first length portion of the tubular element so that the first length portion of the tubular element is of a different dimensional size than a second length portion of the tubular element.

The present disclosure is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

The detailed description set forth below in connection with the appended drawings is intended as a description of some, but not all, of contemplated embodiments of the disclosure, and is not intended to represent the only form in which the present disclosure may be constructed or utilized. The description sets forth the functions and the sequence of steps for developing and operating the disclosure in connection with the illustrated embodiments.

It is to be understood, however, that the same or equivalent functions and sequences may be accomplished by different embodiments that are also intended to be encompassed within the spirit and scope of the disclosure. It is further understood that the use of relational terms such as first and second, top and bottom, and the like are used solely to distinguish one entity from another entity without necessarily requiring or implying any actual such relationship or order between such entities.

Figures 1, 2:
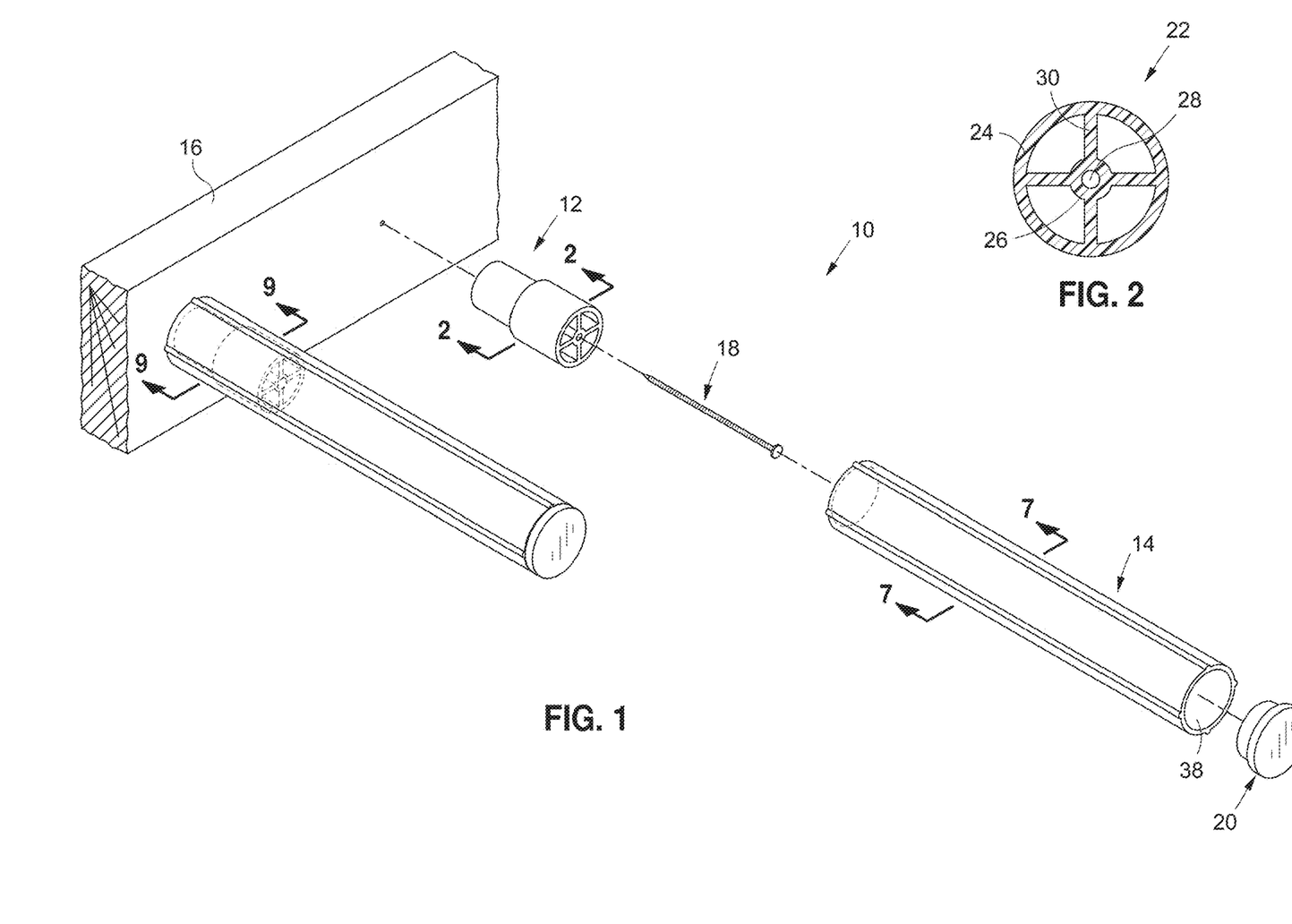
FIG. 1 is an upper perspective view of an embodiment of a concrete dowel placement system.
FIG. 2 is a front cross-sectional view of an embodiment of a first tubular element having four reinforcement walls.

Referring to FIG. 1, a perspective view of an embodiment of a concrete dowel placement system 10 in accordance with an aspect of the present disclosure is illustrated. The concrete dowel placement system 10 generally includes a coupler 12, a sheath 14, and an end cap 20. The concrete dowel placement system 10 may be used to form a concrete structure.

Now referring to FIG. 2, the coupler 12 includes a first tubular element 22 (e.g., a first end portion) having an outer sleeve 24 and an inner sleeve 26 defining an aperture 28 extending along the entire length of the outer sleeve 24. The first tubular element 22 further includes at least one reinforcement wall 30 between the outer sleeve 24 and the inner sleeve 26. The reinforcement wall 30 secures the inner sleeve 26 to the outer sleeve 24 so that the inner sleeve 26 may receive a securing device 18. By way of example and not limitation, FIG. 2 shows a front cross-sectional view of a first tubular element 22 that includes four reinforcement walls 30. However, it is also contemplated that the first tubular element 22 may include any number of reinforcement walls 30.

Figure 3:
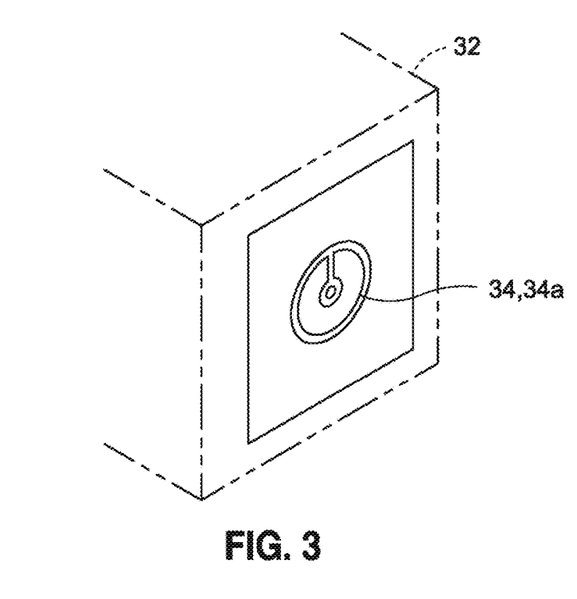
FIG. 3 is an upper perspective view of an extrusion die head having a first extrusion aperture.
Figure 4:
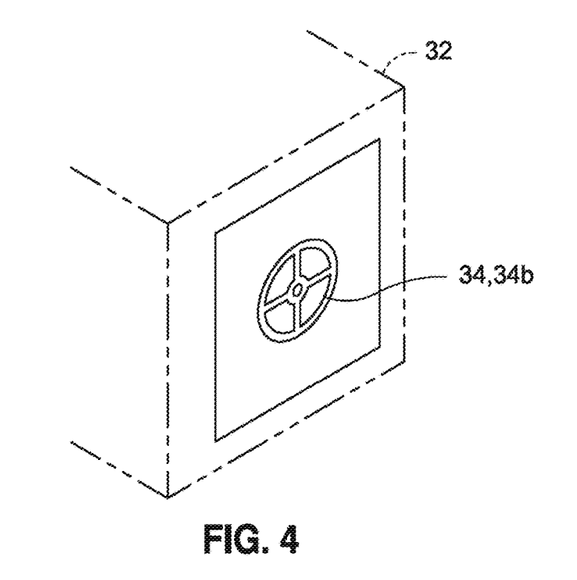
FIG. 4 is an upper perspective view of an extrusion die head have a second extrusion aperture.

Referring to FIGS. 3 and 4, the first tubular element 22 may be formed via extrusion, which may include extruding a material, such as a polymer, preferably a thermoplastic polymer, through a die head 32 to form the first tubular element 22. The extrusion die head 32 may include an extrusion aperture 34. FIGS. 3 and 4 illustrate exemplary extrusion die heads 32 through which the extrusion of the material may be performed. Each extrusion die head 32 includes an extrusion aperture 34 through which a material is extruded. By way of example and not limitation, FIGS. 3 and 4 show exemplary extrusion apertures 34a and 34b where the extrusion apertures 34, in minor part, or substantially define the cross sectional shape of the first tubular element 22 formed during extrusion. Further, it is also contemplated that the material may be extruded by alternative methods other than through die heads 32 having extrusion apertures 34. It is contemplated that the extrusion may occur through any shaped space such that the extruded material acquires a cross-sectional shape which is substantially the same as the shape of the shaped space during extrusion.

By way of example and not limitation, it is contemplated that the extruded material may alternatively be a thermosetting polymer or any other material that may be appreciated by one of ordinary skill of the art that does not depart from the spirit of the present disclosure. Further, the material may be any polymer that falls within the scope of the materials discussed above, that will not chemically react with concrete so as to substantially weaken the polymer or the concrete during the lifespan of the use of the polymer within the concrete.

The first tubular element 22 may be formed via extrusion to have a circular cross sectional configuration in a plane perpendicular to a longitudinal axis, so as to resemble a traditional pipe or tube. This circular configuration allows for less material to be used in order to manufacture the first tubular element 22, thus reducing cost. Alternatively, the first tubular element 22 may be formed via extrusion to have a quadrangular configuration.

Figure 5:
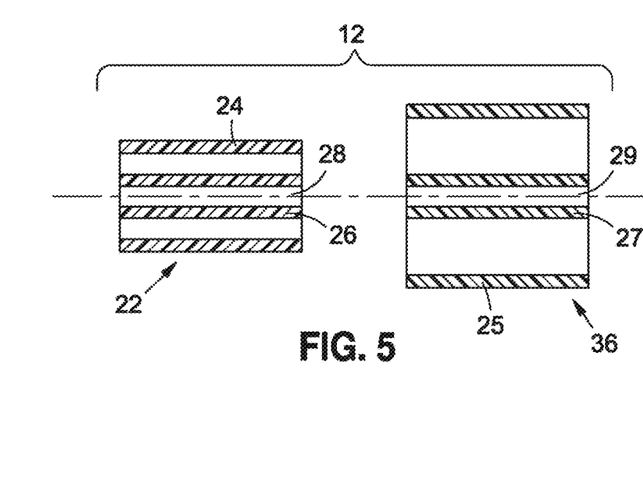
FIG. 5 is a side cross-sectional view of embodiments of a first tubular element and a second tubular element.

As shown in FIG. 5, the coupler 12 of the concrete dowel placement system 10 further includes a second tubular element 36 (e.g., a second end portion) of a different dimensional size than the first tubular element 22. The second tubular element 36 includes an outer sleeve 25 and an inner sleeve 27 defining an aperture 29 extending along the entire length of the outer sleeve 25. The second tubular element 36 further includes at least one reinforcement wall between the inner sleeve 27 and the outer sleeve 25. The second tubular element 36 may differ from the first tubular element 22 in size only, and thus, the cross-sectional configuration depicted in FIG. 2 may also be representative of a cross-sectional view of an exemplary embodiment of the second tubular element 36, albeit on a different scale. It is further contemplated that the second tubular element 36 may be formed via extrusion as described herein. More specifically, the second tubular element 36 may be formed via extrusion through an extrusion die head 32 or by any other form of extrusion that would be appreciated by a person of ordinary skill in the art.

With regard to the first tubular element 22 and second tubular element 36, it is further contemplated that at least one of the first tubular element 22 and the second tubular element 36 may be formed to have a diameter of slightly less than five-eighths inches so that a slip dowel 56 with a diameter of about five-eighths inches may be used with the concrete dowel placement system 10 as will be discussed in further detail herein. Although, it is also contemplated that neither the first tubular element 22 nor the second tubular element 36 is about five-eighths inches, but rather is of some other dimensional size. Additionally, the second tubular element 36 may be formed to have the same configuration as the first tubular element 22, but it is also contemplated that the configurations of the first tubular element 22 and the second tubular element 36 may be different. By way of example and not limitation, according to one embodiment, the first tubular element 22 is formed to have a circular configuration while the second tubular element 36 is formed to have a quadrangular configuration. Other alternative configurations are also contemplated, such as oval or rounded rectangle configurations.

Figure 6:
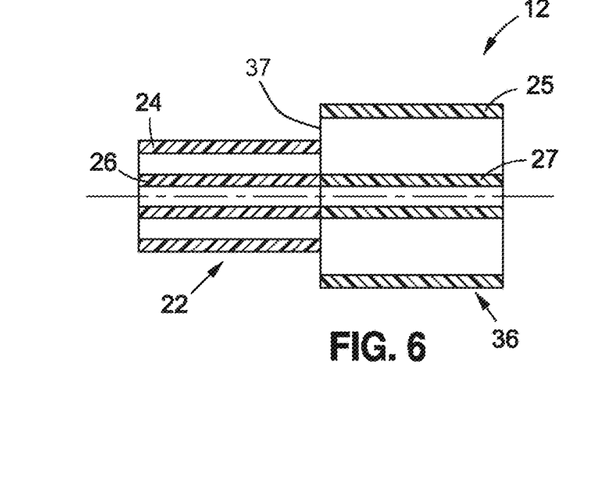
FIG. 6 is a side cross-sectional view of an embodiment of a coupler.

By the embodiment of a coupler 12 shown in FIG. 6, an end portion of the outer sleeve 25 of the second tubular element 36 is attached to an end portion of the outer sleeve 24 of the first tubular element 22 to form the coupler 12. The second tubular element 36 may define an intermediate surface 37 adjacent the first tubular element 22. The first tubular element 22 and second tubular element 36 may be attached at absolute ends, but it is also contemplated that attachment may be achieved by inserting an end portion of the first tubular element 22 into a hollow of an end portion of the second tubular element 36.

The concrete dowel placement system 10 further includes an elongated, tubular, dowel-receiving sheath 14 (see FIGS. 1 and 12) having at least one interior opening 38 extending along the entire length of the sheath 14, the sheath 14 being slidably extensible over one of the first tubular element 22 and the second tubular element 36 to frictionally engage the sheath 14 to the coupler 12. The sheath 14 having an empty and smooth interior opening 38 allows for the desired unrestricted slippage of the slip dowel 56 within the sheath 14 once the slip dowel 56 has been placed within a second concrete section 58. Further, the sheath 14 may be formed to have a longitudinal length of about twelve inches so that a slip dowel 56 may be advanced twelve inches into a section of concrete as will be discussed in further detail herein, but it is alternatively contemplated that any other length sufficient for placing a slip dowel 56 may be used.

Figure 7:
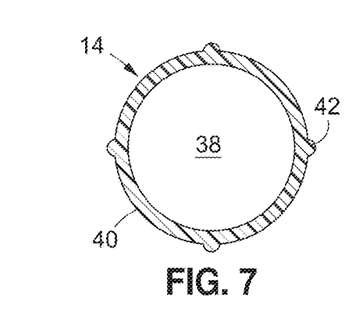
FIG. 7 is a front cross-sectional view of an embodiment of a sheath having rib protrusions on an outer surface of the sheath.
Figure 8:
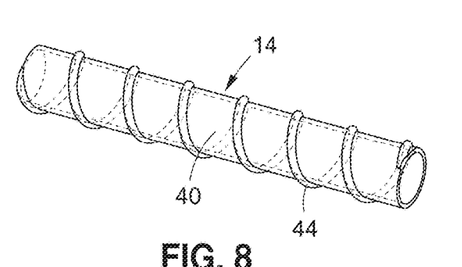
FIG. 8 is a perspective view of an embodiment of a sheath having a helical element on an outer surface of the sheath.

It is contemplated that the sheath 14, similar to other components of the concrete dowel placement system 10, may be formed via extrusion through an extrusion die head or any other process of extrusion that would be known by a person of ordinary skill in the art, such as the processes described above. Further, it is contemplated that the sheath 14 may be formed via extrusion to include a completely smooth outer surface 40, but it is also contemplated that the outer surface 40 of the sheath 14 may be formed to be not completely smooth. For example, the sheath 14 may be formed via extrusion to include at least one or a plurality of elements on the outer surface 40 of the sheath 14 that extend along the longitudinal axis of the sheath 14. Such elements may include linear rib protrusions 42 or linear grooves. The outer surface 40 of the sheath 14 may be formed to also include raised or grooved helical elements 44. FIG. 7 shows a cross-sectional view of an embodiment of a sheath 14 including rib protrusions 42 on the outer surface 40 of the sheath 14. Additionally, FIG. 8 is an upper perspective view of a sheath 14 that includes a raised helical element 44 on the outer surface 40 of the sheath 14. In a similar vein, it is contemplated that the sheath 14 may be formed via extrusion to include a sinusoidal outer surface 40 on the sheath 14 or a helical uneven outer surface 40 on the sheath 14. The external features formed on the outer surface of the sheath, e.g., ribs or raised elements, may mitigate cracks formation in the concrete.

Figure 9:
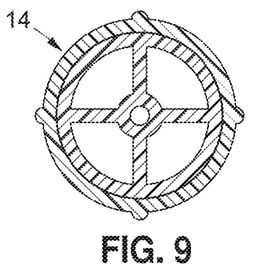
FIG. 9 is a front cross-sectional view of an embodiment of a coupler disposed within an embodiment of a sheath.

The aforementioned elements and characteristic features that may be formed on the outer surface 40 of the sheath 14 allow for improved attachment between the concrete and the sheath 14, as concrete is more prone to cracking when it is attached to completely smooth surfaces. A secure, crack-resistant attachment between the sheath 14 and the concrete is critical because the secure attachment allows the slip dowel 56 to slide within the sheath 14 without disrupting the functionality of the sheath 14 as will be discussed in more detail below. To clarify how the sheath 14 may engage the coupler 12, FIG. 9 shows a front cross-sectional view of an embodiment of a concrete dowel placement system 10 where a sheath 14 has been slidably extended over a coupler 12.

The concrete dowel placement system 10 may also include an end cap 20 attachable to an end portion of the sheath 14 to completely cover the interior opening 38 at the end of the sheath 14. The end cap 20 helps prevent pourable concrete from entering the interior opening 38 of the sheath 14 while the concrete hardens. The end cap 20 may be a element of duct tape or construction tape, a cap, a plug, a element of film, or any blockade that is either permanently affixed or removably attached to the distal end of the sheath 14.

As shown in FIGS. 23-26, the sheath 14 may include have an outer surface 40 textured to provide additional surface area. Concrete is more prone to cracking when attached to smooth surfaces. Adding surface area to the sheath 14 may help to reduce the possibility of cracking of the concrete. A regular texture pattern may repeat over the outer surface 40 in a predictable sequence. An irregular texture pattern would not repeat over the outer surface 40 in a predictable sequence. Further, the texturing may be a negative form of texturing. In negative texturing, material has been removed from the outer surface to create the texture. Alternatively, the texturing may be other positive protrusions, that is, material may have been added to the outer surface 40 of the sheath 14.

As one example, the texturing may have a negative random pattern. Such texturing can be created by distressing the outer surface 40 of an extruded sheath 14 with a wire brush. As discussed above, such a texture may be formed after extrusion by taking heavy wire brushes to the smooth outer surface 40 of the extruded sheath 14. The heavy wire brush bristles may create a randomized or irregular gouged pattern in the outer surface 40. By removing material, the wire brush may create additional surface area on the outer surface 40. The added and irregular surface area may allow for a lower instance of cracking in the concrete formed around the sheath 14.

Figures 23, 24, 25, 26:
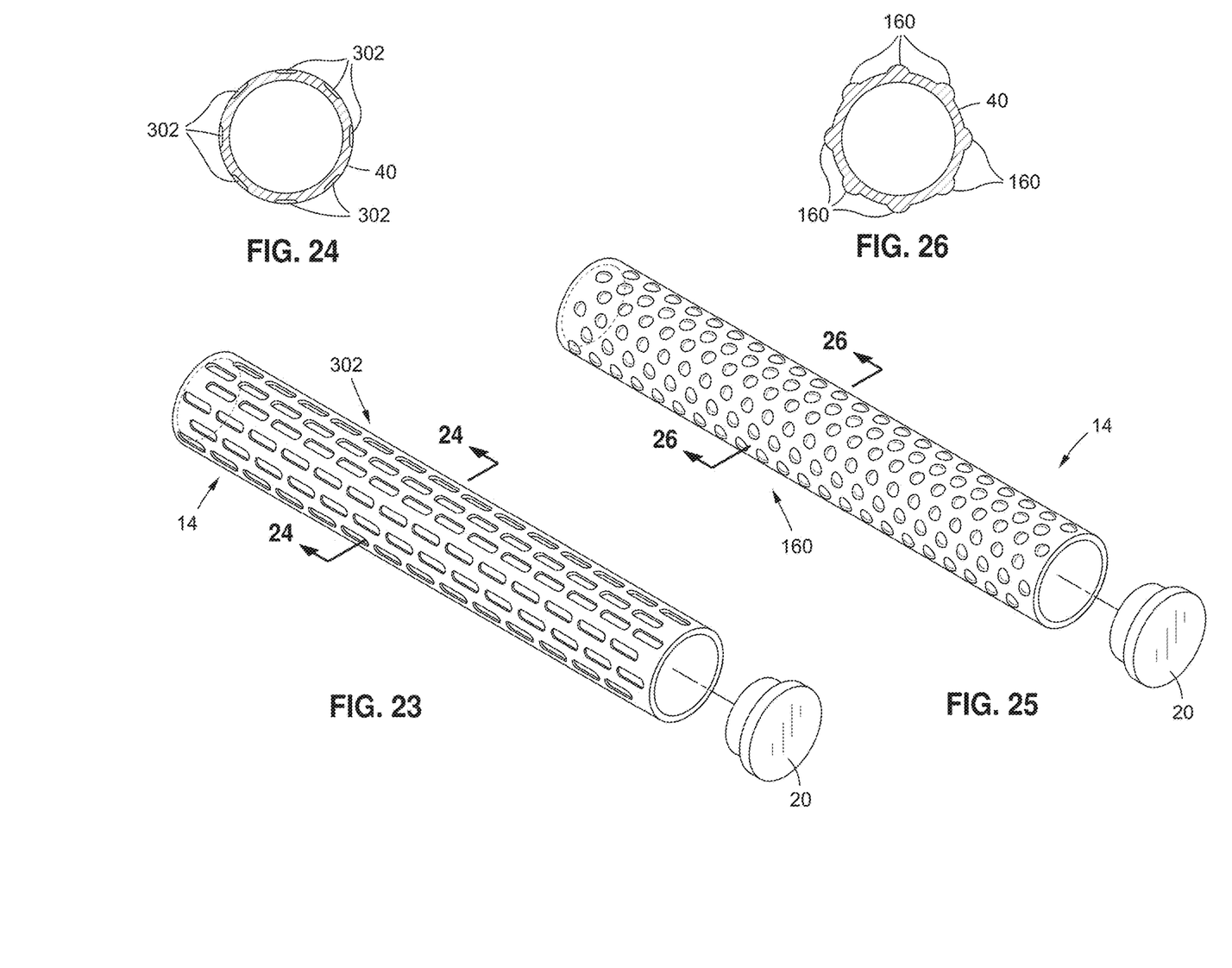
FIG. 23 is a perspective view of a sheath with a textured surface and a cap.
FIG. 24 is a transverse cross sectional view of the sheath of FIG. 23 taken along line 24-24.
FIG. 25 is a perspective view of a sheath with a textured surface and a cap.
FIG. 26 is a transverse cross sectional view of the sheath of FIG. 25 taken along line 26-26.

Alternatively, the texturing may be of a negative regular pattern. In one exemplary embodiment, the sheath 14 may be injection molded. As shown in FIGS. 23 and 24, the mold may include a portion which forms dimples 302 in the outer surface 40 of the sheath 14. The dimple 302 pattern in the outer surface 40 may be regular. For example, as shown in FIG. 23, the dimples 302 may be arranged in alternating offset longitudinal rows which span substantially the length of the sheath 14. In other exemplary embodiments, the dimples 302 are irregularly formed on the outer surface 40. The individual dimples 302 may all have the same shape or may have more than one shape. For example, the shape of the outer perimeter of the dimples 302 may vary, or the depths of the dimples may vary, or both. The presence of the texture is more important than the precise form of the dimples.

Alternatively, the sheath 14 may be injection molded in a mold designed to add material to the sheath as compared to a sheath 14 with a smooth outer surface 40. The material may be in a positive regular texture pattern. As discussed above, in a positive texturing, material may be added to form knobs 160 of the sheath 14 of FIG. 25. The knobs 160 may be arranged in a regular, or repeating, pattern. A regular pattern of exclusively raised knobs 160 is shown in FIGS. 25 and 26. As shown in FIG. 25, the knobs 160 may be arranged in alternating offset longitudinal rows which span substantially the length of the sheath 14. In other exemplary embodiments, the raised knobs may be placed in an irregular or non-repeating pattern. The knobs 160 may be formed exclusively, as is shown in FIG. 25, or may be formed in combination with the dimples 302 (FIG. 23). The knobs 160 and dimples 302 (FIG. 23) on the outer surface 40 may be formed in either a regular or irregular arrangement. Because the knobs add material to the sheath 14, rather than removing material as with the negative texturing in sheath 14 of comparable wall thickness, the additional material can add strength to the sheath 14.

As yet another alternative, the sheath 14 may be injection molded with a smooth outer surface 40. The outer surface 40 may then be textured. As described above, the outer surface may be textured using a heavy wire brush, with the key difference that the texturing occurs after injection molding of the sheath 14, rather than extrusion of the sheath 14. The heavy wire brush bristles may create a randomized gouged pattern in the outer surface 40. The texturing of the wire brush may create additional surface area on the outer surface 40, which helps prevent cracking of the concrete.

Figures 27, 29:
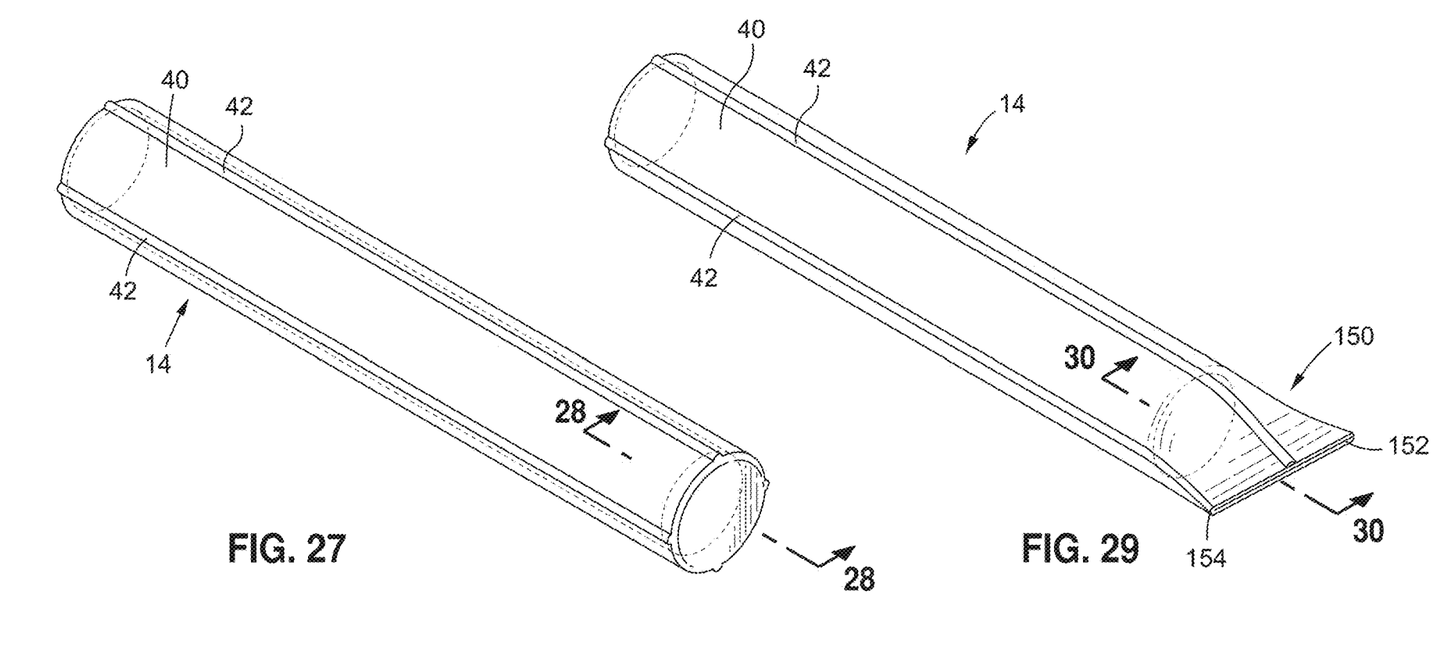
FIG. 27 is a perspective view of a sheath with a sealed end cap.
FIG. 29 is a perspective view of a sheath with a crimped end.
Figure 28:
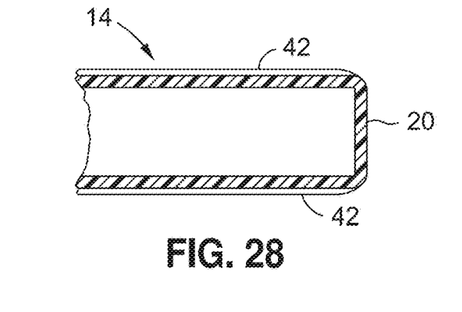
FIG. 28 is a longitudinal cross sectional view of the sheath of FIG. 27 taken along the line 28-28.

As shown in FIGS. 27 and 28, the sheath 14 may have a cap 20 formed from the same piece of material as the sheath 14. By way of example and not limitation, the sheath 14 and cap 20 may be injection molded, so that the sheath 14 and the cap 20 may form a single piece of material. Thus, the longitudinal cross section of the sheath 14 is not closed or crimped. Rather, the cross section is the same as the two-piece sheath and cap configuration, but is all formed from the same piece of material. The sheath 14 may include some form of texturing as described above. For example, the sheath may have raised ribs 42 on the exterior surface 40.

Figure 30:
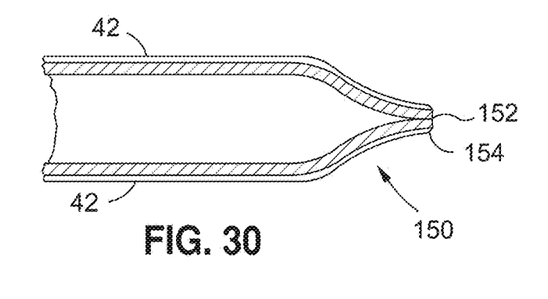
FIG. 30 is a longitudinal cross sectional view of the sheath of FIG. 29 taken along the line 30-30.

Alternatively, as shown in FIGS. 29 and 30, the cross section of a free end portion 150 of the sheath 14 may be altered to close the free end portion 150. As shown in FIGS. 29 and 30, the free end portion 150 may be pinched or crimped to close an opening 152 of the free end portion 150. Pinching or crimping may be used as an alternative to using an end cap. The pinching or crimping alters the transverse cross section of the sheath 14 at the free end portion 150. The sheath 14 may be pinched at the opening 152 so that the opening 152 is collapsed, with each of two 180-degree arcs of the opening 152 compressed to form a straight line. The two lines abut one another to close off the opening 152. When viewed from a first orientation of the sheath 14, the profile of the free end portion 150 appears triangular, with the point of the triangle at a tip 154 of the free end portion 150. When viewed rotated 90 degrees from the first orientation the free end portion 150 appears trapezoidal, with the wider end oriented toward the tip 154 of the free end portion 150. The closure of the free end portion 150 may be maintained by welding the material of the tip 154 together, or by using an adhesive to join the material, or by using mechanical fasteners. The sheath 14 may include some form of texturing as described above. For example, the sheath may have raised ribs 42 on the exterior surface 40.

Figure 10:
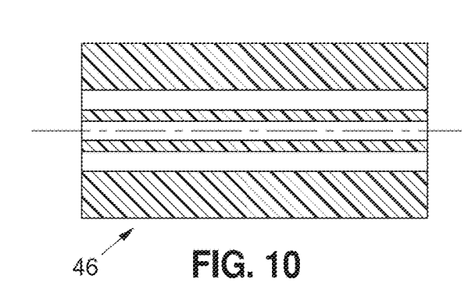
FIG. 10 is a side cross-sectional view of an embodiment of a tubular element.

An additional embodiment of the disclosure relates to another method of constructing a coupler 12. Now referring to FIGS. 10 and 11, in this embodiment, the coupler 12 may be formed by first extruding a material, such as a polymer, to form a tubular element 46 having a first length portion 48 and a second length portion 50. The tubular element 46 further includes at least one interior opening 38 extending along the entire length of the tubular element 46. By way of example and not limitation, FIG. 10 illustrates a cross-sectional view of an exemplary embodiment of a tubular element 46.

Figure 11:
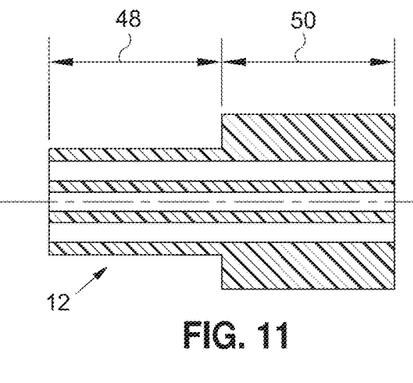
FIG. 11 is a side cross-sectional view of an embodiment of a coupler.

Next, as FIG. 11 shows, this method includes removing some of the material from the first length portion 48 of the tubular element 46 so that the first length portion 48 of the tubular element 46 is of a different dimensional size than the second length portion 50 of the tubular element 46, thus ultimately forming a coupler 12.

By way of example and not limitation, the step of removing some of the material from a first length portion 48 of the tubular element 46 may be by lathing, milling, or computer numerical control machining devices.

Figure 12:
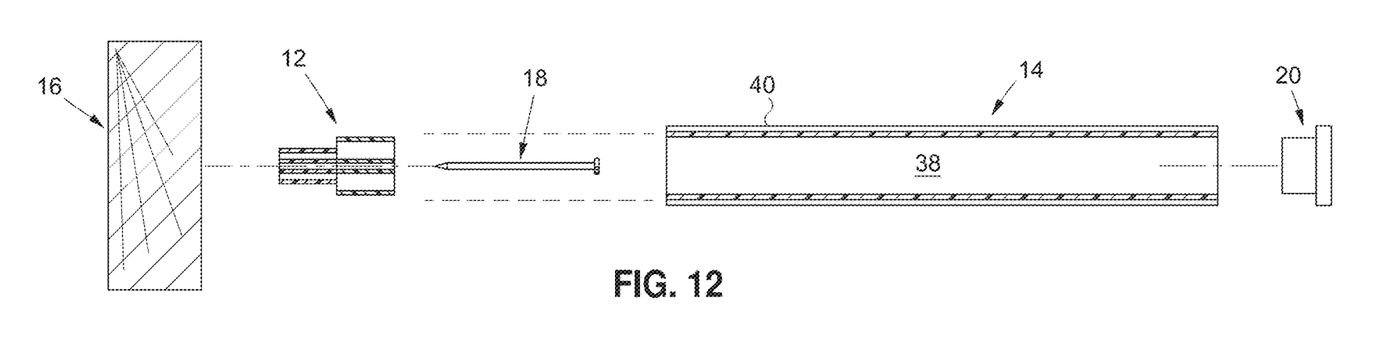
FIG. 12 is a side cross-sectional exploded view of the concrete dowel placement system of FIG. 1.
Figure 13:
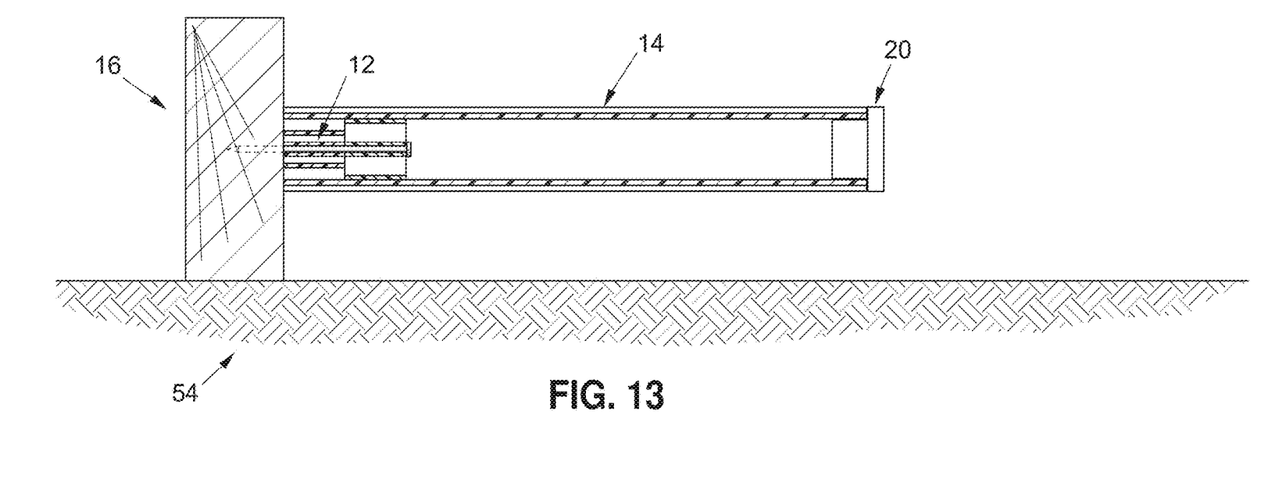
FIG. 13 is a side cross-sectional view of the concrete dowel placement system of FIG. 1 employing a first orientation of a coupler having an outer sleeve of a first diameter at a distal end.

Now referring to FIGS. 12 and 13, the concrete dowel placement system 10 discussed above may be used to form a concrete structure, however, before any concrete is poured, at least one coupler 12 is affixed to a form section 16. A form is used to define the shape of the concrete once it hardens. The coupler 12 may be affixed using a securing device 18. The securing device 18 may be a nail, screw, or any other device similar in nature so that the coupler 12 may be securely affixed to the form section 16. Alternatively, the coupler 12 may also be affixed to the form section 16 using adhesive placed on a proximal end of the coupler 12, or any other appropriate method of attachment that would be appreciated by one of ordinary skill of the art. According to various aspects of the present disclosure, the configuration of the coupler 12 and the corresponding sheath 14 allows the coupler 12 to be formed without a flange at the end portion which abuts the form section 16. Thus, the outer sleeve 24 of each tubular element of the coupler 12 may define the maximum outer diameter of the coupler 12, and the tubular elements themselves are capable of withstanding the forces associated with pouring concrete around the sheath 14. In a contemplated embodiment, to prepare to pour a large section of concrete, a plurality of couplers 12 is affixed to the form section 16 in a straight line; the line may run generally parallel to the underlying support surface 54.

It is to be appreciated that the form section 16 to which the couplers 12 are attached is part of a complete form used to dictate the shape of the concrete once the concrete hardens. That is, the form section 16 is part of a complete form that forms a boundary for concrete that is poured within the boundary.

The form is arranged upon the underlying support surface 54 so that concrete remains within the boundary defined by the form when the concrete is poured within the form. The form may be made of wooden studs or planks, plastic slabs, or any supports that will not chemically react with the concrete in a way that adversely affects the shape or structural integrity of the concrete.

A sheath 14 is slidably disposed over each of the couplers 12 and may be held in place by friction or by other means of attachment, such as adhesives. One of ordinary skill in the art will appreciate that the fit between each coupler 12 and its corresponding sheath 14 is tight and sealed enough so that it is unlikely that pourable concrete can leak into the sheaths 14 when the concrete is poured. Concrete leaking into the interior of the sheaths 14 can negatively impact one of the functions of the concrete dowel placement system 10, which is to allow slip dowels 56 to slide freely within the sheaths 14. Further, regardless of the method used to secure the coupler 12 to the form section 16, it is contemplated that the secure and sealed connection between the coupler 12 and the form section 16 can be maintained during the pouring of the concrete and until the concrete hardens. That is, the connection between the coupler 12 and sheath 14 is strong enough such that the pouring of the concrete does not break or disrupt the connection.

An attachable end cap 20 may be disposed on a distal end of the sheath 14 to completely cover the opening 38 at the end of the sheath 14 to prevent pourable concrete from leaking into the interior of the sheath 14 after the concrete is poured over the concrete dowel placement system 10.

Figure 14:
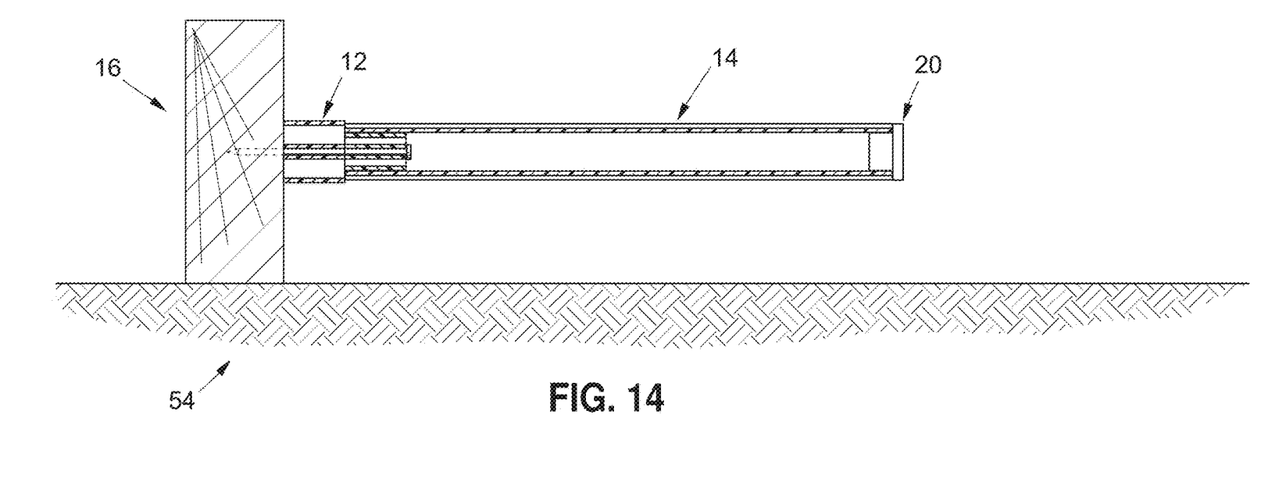
FIG. 14 is a side cross-sectional view of the concrete dowel placement system of FIG. 1 employing a second orientation of a coupler having an outer sleeve of a second diameter at a distal end.

Now referring to the cross-sectional view of two different orientations of a concrete dowel placement system 10 of FIGS. 13 and 14, the coupler 12 may have at least two positional orientations. As shown in FIG. 13, in one orientation, the smaller end of the coupler 12 is affixed to the form section 16. The smaller end may have a diameter or cross-sectional area that is smaller than the diameter or cross-sectional area of the bigger end. This permits a sheath 14 with an interior size similar to the bigger end of the coupler 12 to slidably engage the bigger end of the coupler 12. Alternatively, as shown in FIG. 14, a bigger end portion of the coupler 12 may be affixed to the form section 16. In this case, a sheath 14 with an interior size similar to the size of the smaller end of the coupler 12 may slidably engage the smaller end of the coupler 12. Thus, the coupler 12 may have at least two different orientations upon the form section 16 to allow connectability with at least two different sheaths 14 having different dimensions. As can be seen at least from FIGS. 1, 13, and 14, the outer diameter of the first tubular element may be substantially uniform along its length, and similarly, the outer diameter of the second tubular element may be substantially uniform along its length. It is to be appreciated that regardless of the positional orientation of the coupler 12, the connection between the coupler 12 and the sheath 14 is tight and sealed enough to prevent pourable concrete from substantially intruding into the interior of the sheath 14.

Figure 15:
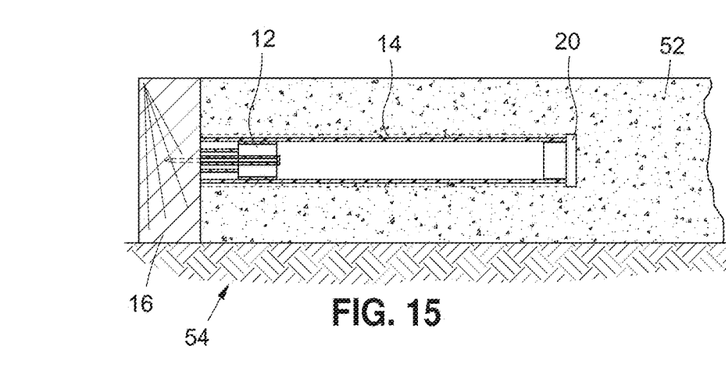
FIG. 15 is a side cross-sectional view of the concrete dowel placement system of FIG. 13 disposed within a first concrete section.

Next, concrete may be poured within a first form. Now referring to FIG. 15, concrete is poured onto the underlaying support surface 54 and within the first form. The poured concrete makes contact with the sheath 14 and the end cap 20. It is contemplated that the pourable concrete may completely cover the outer surfaces 40 of the sheath 14 and the end cap 20 that are exposed to the pourable concrete. Once the concrete hardens, this portion of concrete is a first concrete section 52. The concrete of the hardened first concrete section 52 affixes to the sheath 14 to prevent movement between the sheath 14 and the hardened first concrete section 52. As shown in FIG. 15, after the first concrete section 52 is established, the interior of the sheath 14 remains hollow except possibly for a portion of the end cap 20 which may be disposed within an end portion of the sheath 14 if the end cap 20 is in the form of, for example, a plug. The empty interior of the sheath 14 allows a slip dowel 56 to be inserted within the sheath 14 at a later time.

Figure 16:
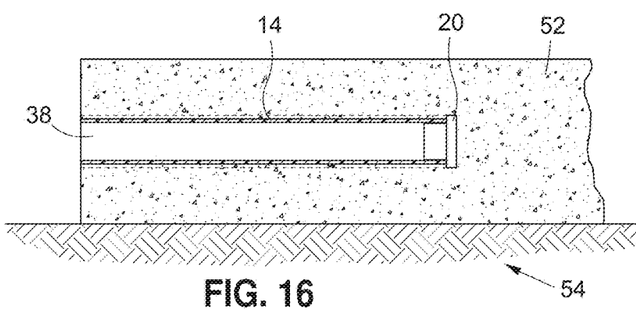
FIG. 16 is a side cross-sectional view of the concrete dowel placement system of FIG. 15 wherein a form section and the coupler have been removed.
Figure 17:
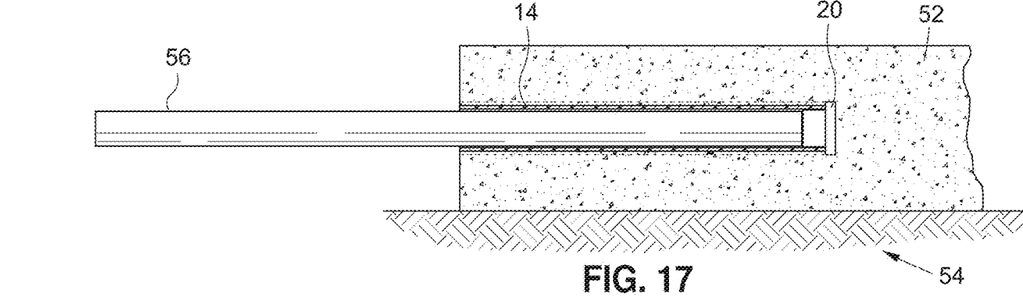
FIG. 17 is a side cross-sectional view of the concrete dowel placement system of FIG. 16 wherein a portion of a slip dowel is disposed within an interior opening of a sheath.

Referring to FIGS. 16 and 17, after the first concrete section 52 hardens, the form section 16 and coupler 12 are removed. The removal of the form section 16 and coupler 12 exposes an edge surface of the first concrete section 52, the edge surface allowing access to the interior of the sheath 14. Thus, a slip dowel 56 may be advanced into the sheath 14 as shown in FIG. 17.

The slip dowel 56 may be a smooth steel rod, but it is contemplated that the slip dowel 56 may be made of aluminum, iron, or any other suitable metal or metal alloy strong enough to endure longitudinal or vertical compression and expansion forces that may occur between sections of concrete without bending substantially. Further, the entire outer surface of the slip dowel 56 need not be smooth. For example, a length portion of the slip dowel 56 may include a ribbed outer surface, similar to the outer surface of typical re-bar, or include other features on the outer surface such that the slip dowel 56 is unsmooth. It is further contemplated that the edge surface of the first concrete section 52 allows access to a plurality of interior openings 38 of sheaths 14 aligned generally in parallel within the first concrete section 52, thus allowing for a plurality of generally parallel-aligned slip dowels 56 to be inserted into sheaths 14.

The slip dowel 56 may be fully advanced within the sheath 14 so as to make contact with the end cap 20, but it is also contemplated that the slip dowel 56 may be only partially advanced within the sheath 14 to allow space between the inserted end of the slip dowel 56 and the end cap 20. The space can help prevent undesirable pressure within the first concrete section 52 and the second concrete section 58 that may be caused by the slip dowel 56 pressing against the end cap 20 when the concrete expands. Such pressure can potentially expedite undesirable weakening of the concrete.

The slip dowel 56 projects into an area immediately adjacent to the first concrete section 52 to define an exposed segment, allowing for a second concrete section 58 to be poured over the exposed segment of the slip dowel 56.

Figure 18:
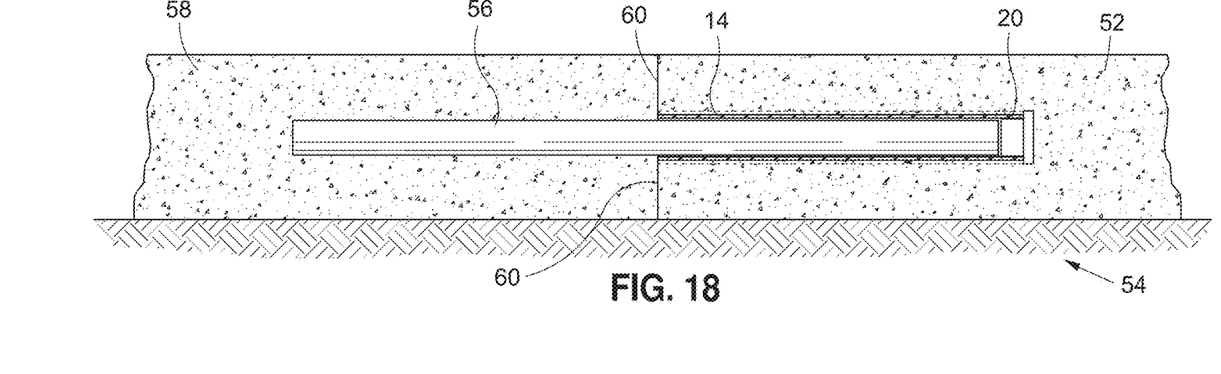
FIG. 18 is a side cross-sectional view of the concrete dowel placement system of FIG. 17 wherein an exposed portion of the slip dowel is disposed within a second concrete section.

Now referring to FIG. 18, next, the second concrete section 58 may be formed. A second form is prepared and disposed upon the underlaying support surface 54, bounding the area immediately adjacent to the first concrete section 52 and encompassing the exposed segments of the slip dowels 56. Then, concrete is poured within the second form and the concrete is allowed to make contact with the exposed segments of the slip dowels 56. The concrete may also completely cover the outer surfaces of the slip dowels 56. After the concrete hardens, this portion of concrete is the second concrete section 58 and the form may be removed.

Since the edge surface of the second concrete section 58 that makes contact with the edge surface of the first concrete section 52 hardens at a different time than the edge surface of the first concrete section 52, a cold joint 60 forms at the interface.

In contrast to the first concrete section 52, which includes a sheath 14 and an end cap 20 disposed within, the second concrete section 58 has no portion of a concrete dowel placement system 10 disposed within, and thus makes contact with the slip dowels 56. This contact with the slip dowels 56 allows the second concrete section 58 to adhere to the slip dowels 56, thus prohibiting movement between the slip dowels 56 and the second concrete section 58. This adhesion allows the slip dowels 56 to slide longitudinally within the sheaths 14 and across the cold joint 60. As the first concrete section 52 and the second concrete section 58 expand and contract, the second concrete section 58 holds onto to the slip dowels 56 while the sheaths 14 disposed within the first concrete section 52 allow the slip dowels 56 to slide back and forth freely within the sheaths 14.

The ability for the slip dowels 56 to slide freely within the sheaths 14 aids in preventing buckling and bulging of the concrete at the cold joint 60. Buckling and bulging is often undesirable because it can result in cracks in the concrete, thus reducing the structural integrity of the concrete, and in the case of a pedestrian application, can pose a safety hazard by increasing the risk of people tripping on the cracks. Cracks and bulging in the concrete may also be considered aesthetically unappealing.

The ability for the slip dowels 56 to slide freely within the sheaths 14 also allows the interface between the first concrete section 52 and the second concrete section 58 to remain aligned, thus preventing faulting, i.e., undesirable skewing of the first concrete section 52 and the second concrete section 58 at the cold joint 60. Skewing at the cold joint 60 may damage the concrete, weaken the concrete, or result in undesirable aesthetics.

Figures 19, 20:
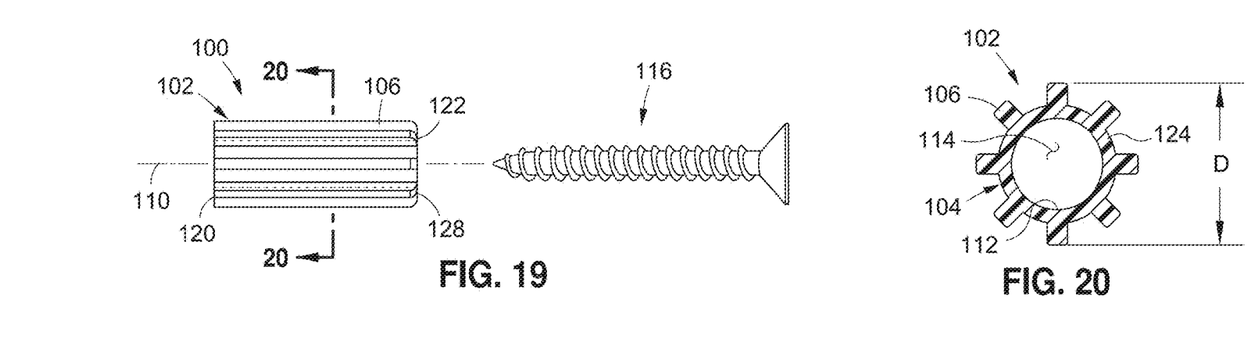
FIG. 19 is an elevational view of another embodiment of a tubular element and a screw adapted for use as part of a concrete dowel placement system.
FIG. 20 is a cross sectional view of the tubular element depicted in FIG. 19.
Figures 21, 22:
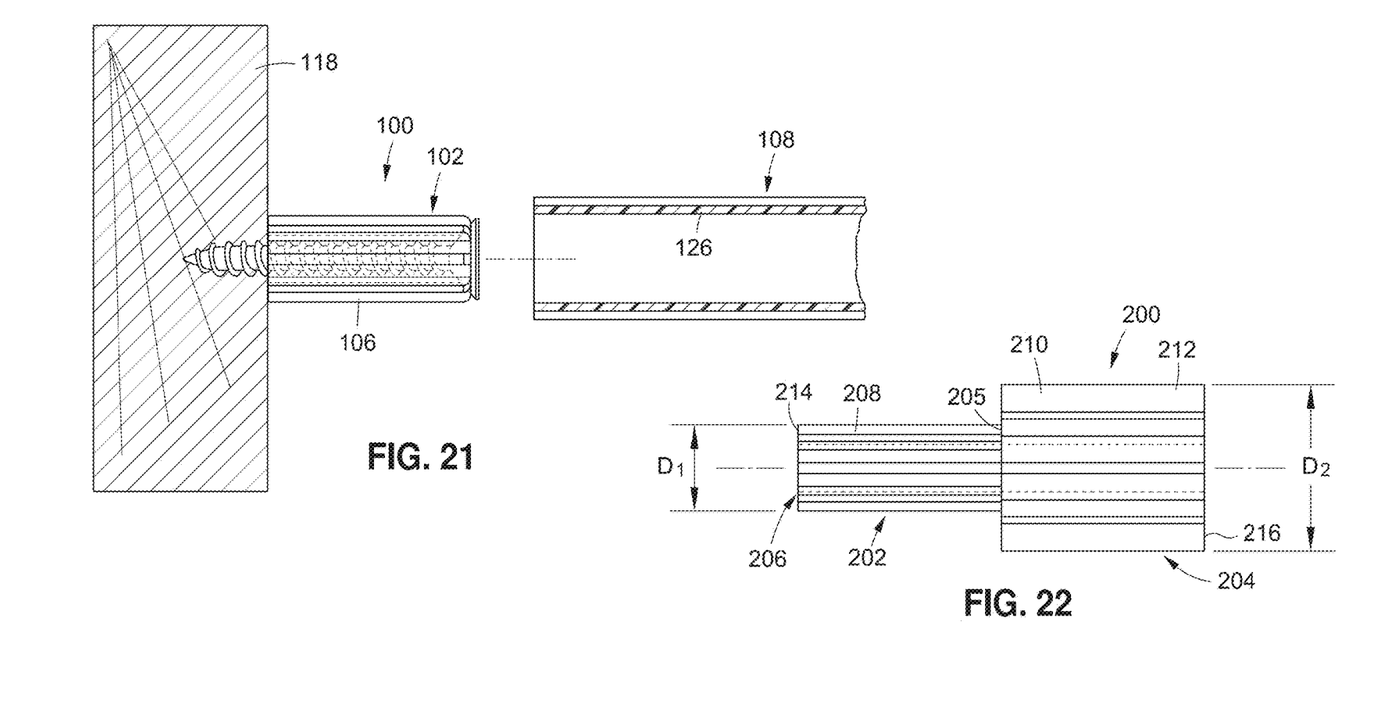
FIG. 21 is a side, partial cross sectional view of a concrete dowel placement system including the tubular element depicted in FIG. 19.
FIG. 22 is another embodiment of a coupler adapted for use as part of a concrete dowel placement system.

Referring now to FIGS. 19-21, there is depicted yet another embodiment of a coupler 100 including a tubular element 102 including an inner sleeve 104 and a plurality of splines 106 extending along the inner sleeve 104. Notably, the coupler in FIGS. 19-21 does not include an outer sleeve coaxially disposed relative to the inner sleeve 104. Rather, the splines 106 extend radially outward from the inner sleeve 104 to provide an outer engagement surface adapted to frictionally engage the sheath 108. The use of splines 106, rather than an outer sleeve, may allow the coupler 100 to be formed using less material, and thus, cost savings may be achieved.

The inner sleeve 104 depicted in FIGS. 19-21 is a cylindrical tube disposed about a central axis 110, and thus, includes an inner surface 112 defining an aperture 114 extending along the length of the inner sleeve 104. The aperture 114 is sized and configured to receive a fastener 116, such as a nail, screw, or the like for securing the coupler 100 to the concrete form 118. The inner sleeve 104 includes a first end 120 and an opposing second end 122, wherein the first end 120 is adapted to be disposed in abutting contact with the concrete form 118 when the coupler 100 is attached thereto.

The plurality of splines 106 are coupled to the inner sleeve 104, with each spline 106 extending radially outward from an outer surface 124 of the inner sleeve 104, so as to define a coupler outer diameter, D. The coupler 100 is configured such that the outer diameter D is sized and configured so as to enable the sheath 108 to be advanced over the coupler 100, with an inner surface 126 of the sheath 108 frictionally engaging with the splines 106. Each spline 106 also extends axially along the outer surface 124 of the inner sleeve 104 between the first and second ends 120, 122 thereof. In the exemplary embodiment, the coupler 100 includes eight splines 106 spaced evenly around the outer circumference of the inner sleeve 104, e.g., the splines 106 are spaced apart by about 45 degrees. As shown in FIGS. 19 and 21, the splines 106 extend completely between the first and second ends 120, 122, with the splines 106 having a beveled surface 128 adjacent the second end 122. However, it is understood that in other implementations, the splines 106 may extend only partially between the first and second ends 120, 122.

The coupler 100 may be formed via extrusion, wherein an extrusion die having an opening corresponding to the cross section depicted in FIG. 20 is used to form the coupler 100, as described in more detail above. Of course, other materials and manufacturing techniques may also be used without departing from the spirit and scope of the present disclosure.

FIGS. 19-21 show the coupler 100 being of a substantially uniform configuration between the first and second ends 120, 122 thereof. In this respect, the outer diameter D is substantially uniform along the length of the coupler 100. Thus, the coupler 100 is adapted for use with a sheath 108 having an inner opening that is of a specific diameter, which corresponds to the outer diameter D of the coupler 100.

However, referring now to FIG. 22, there is depicted another embodiment of a coupler 200 including a first tubular element 202 defining a first outer diameter, $D_1$, and a second tubular element 204 defining a second outer diameter, $D_2$, greater than the first outer diameter $D_1$. The first and second tubular elements 202, 204 are coupled to each other at a joint 205, either through the use of an adhesive, or other joining elements known in the art. The first tubular element 202 includes a first inner sleeve 206 and a plurality of first splines 208, while the second tubular element 204 includes a second inner sleeve 210 and a plurality of second splines 212. The plurality of first splines 208 define the first outer diameter $D_1$, and the plurality of second splines 212 define the second outer diameter $D_2$. The first tubular element 202 defines a first abutment end 214, while the second tubular element 204 defines a second abutment end 216, with the first and second abutment ends 214, 216 each being adapted to be positioned in abutting contact with a concrete form 118, depending on the intended use of the coupler 200, e.g., whether the coupler 200 is to be used with a sheath adapted to frictionally engage the outer surface of the splines 208 on the first tubular element 202, or the splines 212 on the second tubular element 204. In particular, if the coupler 200 is to be used with a sheath which engages with splines 208 on the first tubular element 202, the coupler 200 is attached to the form 118 with the second abutment end 216 coupled to the form, and the first tubular element 202 extending away from the form. Conversely, if the coupler 200 is to be used with a sheath which engages with splines 212 on the second tubular element 204, the coupler 200 is attached to the form 118 with the first abutment end 214 coupled to the form, and the second tubular element 204 extending away from the form.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

What is claimed is:

1. A concrete dowel placement system for use with a concrete form, the concrete dowel placement system comprising:
   a coupler configured to be attachable to the concrete form, the coupler having a first end portion and a second end portion extending along a main axis,
      the first end portion having a first end surface perpendicular to the main axis,
      the second end portion having an intermediate surface adjacent the first end portion and positioned radially outward from the first end portion, the second end portion extending away from the first end portion and terminating at a second end surface spaced from the intermediate surface and perpendicular to the main axis, the intermediate surface defining an outer diameter that is equal to an outer diameter of the second end surface, the second end portion being different in configuration than the first end portion; and
   an elongated, tubular dowel-receiving sheath having an outer surface, an open end portion, a closed end portion, and at least one interior opening extending within the sheath from the open end portion, the open end portion being slidably extensible over the coupler to frictionally engage one of the first end portion and the second end portion of the coupler;
   the coupler and the sheath being configured such that when the sheath is frictionally engaged with the second end portion, the sheath is advanceable over the coupler to be placeable in abutting relation to the concrete form.

2. The concrete dowel placement system recited in claim 1, wherein the closed end portion of the sheath is crimped.

3. The concrete dowel placement system recited in claim 1, wherein the outer surface of the sheath includes raised ribs.

4. The concrete dowel placement system recited in claim 3, wherein the raised ribs extend linearly along the sheath.

5. The concrete dowel placement system recited in claim 1, wherein:
   the first end portion of the coupler includes a first tubular element comprising an inner sleeve and an outer sleeve outside the inner sleeve; and
   the second end portion of the coupler includes a second tubular element comprising an inner sleeve and an outer sleeve outside the inner sleeve.

6. The concrete dowel placement system recited in claim 5, wherein the first tubular element includes a plurality of splines extending longitudinally along the inner sleeve.

7. The concrete dowel placement system recited in claim 1, wherein the outer surface of the sheath includes a plurality of dimples.

\* \* \* \* \*